T. NIEMOTH.
WEEDING DEVICE.
APPLICATION FILED JULY 24, 1917.
1,277,998.
Patented Sept. 3, 1918.
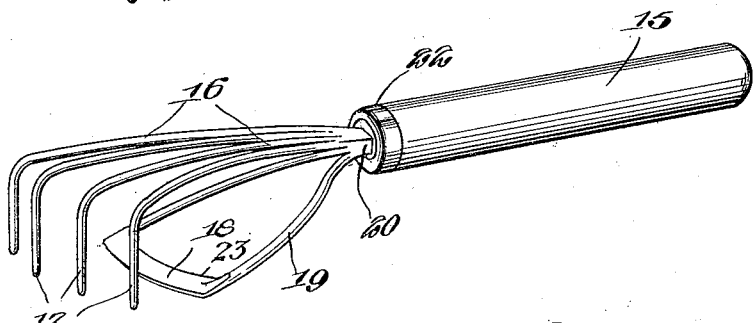
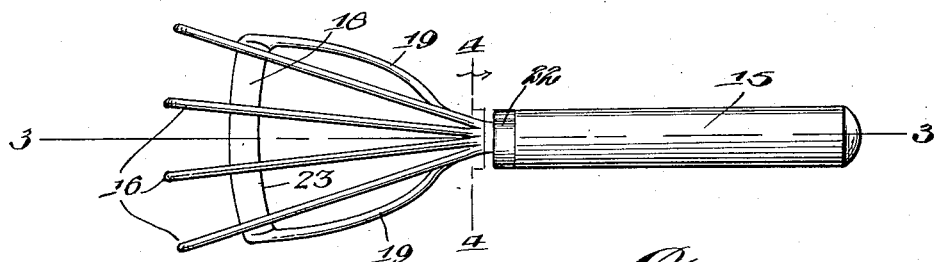
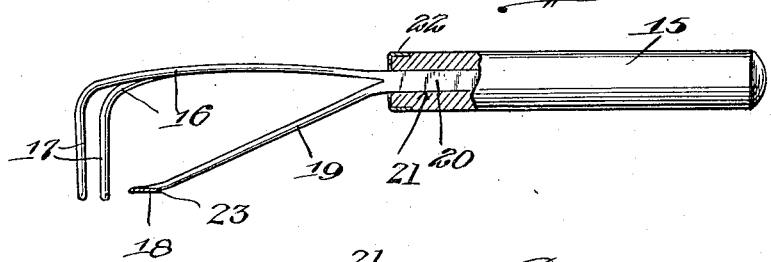
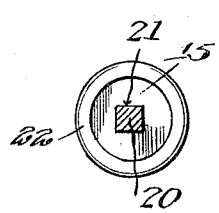
Inventor
T. Niemoth.
Witnesses
By Victor J. Evans.
Attorney

UNITED STATES PATENT OFFICE.

THEODORE NIEMOTH, OF ESTHERVILLE, IOWA.

WEEDING DEVICE.

1,277,998.  Specification of Letters Patent.  Patented Sept. 3, 1918.

Application filed July 24, 1917. Serial No. 182,492.

*To all whom it may concern:*

Be it known that I, THEODORE NIEMOTH, a citizen of the United States, residing at Estherville, in the county of Emmet and State of Iowa, have invented new and useful Improvements in Weeding Devices, of which the following is a specification.

This invention relates to weeding devices, and it has for its object to produce a very simple and efficient tool adapted for manual use and by the use of which weeds may be cut and disposed of and the soil may be loosened about the growing plants to facilitate the admission of air and moisture to the roots, thereby promoting the growth of plants.

A further object of the invention is to produce a simple, inexpensive and thoroughly efficient hand tool for the use of gardeners and florists and by means of which the work of weeding and working the soil in greenhouses and similar places will be greatly facilitated.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a perspective view of a tool constructed in accordance with the invention.

Fig. 2 is a top plan view of the same.

Fig. 3 is a longitudinal sectional view taken on the line 3—3 in Fig. 2.

Fig. 4 is a transverse sectional view taken on the line 4—4 in Fig. 2.

Corresponding parts in the several figures are denoted by like characters of reference.

The handle 15 of the improved tool is socketed for the reception of a tang 20 having a plurality of divergent fingers 16, the ends of which are down-turned to produce claws or teeth 17 adapted for engagement with the soil. The fingers 16 are arranged substantially in a horizontal plane as shown. A cutting member is provided, the same comprising a blade 18 having convergent arms 19 connected with the tang 20 which is socketed in the handle 15 and with respect to which the arms 19 diverge outwardly as shown. The handle 15 in addition to the socket which is designated by 21 is provided with a ferrule 22 to assist in securely assembling the parts.

In the operation of the improved tool the blade 18 will cut the weeds, while the claws 17 will serve not only to agitate the soil, but also to gather the tops of the weeds enabling them to be thrown to one side as required. The cutting edge 23 of the blade 18 faces in a rearward direction, thus enabling the tool to be very easily operated by pulling the same. The operator by means of the improved tool is enabled to work close to the stalks and roots of the plants that are to be preserved, and the tool is one which with great facility may be effectively operated.

Having thus described the invention, what is claimed as new, is:

In an implement of the class described, a tang formed with a plurality of forwardly extending fingers diverging outwardly from the tang in a substantially horizontal plane and having downturned ends producing earth-engaging claws, said tang being also formed with arms diverging outwardly and downwardly beneath the fingers, said arms carrying a blade disposed rearwardly of the downturned claws and approximately in the horizontal plane of the lower ends of said claws, said blade having a cutting edge facing in a rearward direction, and a handle in which the tang is socketed.

In testimony whereof I affix my signature.

THEODORE NIEMOTH.

Copies of this patent may be obtained for five cents each, by addressing the "Commissioner of Patents, Washington, D. C."